(12) United States Patent
Biswas et al.

(10) Patent No.: US 11,818,293 B1
(45) Date of Patent: Nov. 14, 2023

(54) SYSTEMS AND METHODS FOR DETERMINING OPTIMUM CUSTOMER ROUTING PATH

(71) Applicant: Verizon Patent and Licensing Inc., Basking Ridge, NJ (US)

(72) Inventors: Subham Biswas, Thane (IN); Keerthivasan Madurai, Chengalpattu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/840,010

(22) Filed: Jun. 14, 2022

(51) Int. Cl.
  *H04M 3/523* (2006.01)
  *H04M 3/42* (2006.01)
  *H04Q 3/00* (2006.01)
  *H04M 3/22* (2006.01)

(52) U.S. Cl.
  CPC ............ *H04M 3/523* (2013.01); *H04M 3/22* (2013.01); *H04M 3/4228* (2013.01); *H04Q 3/0029* (2013.01); *H04Q 2213/13541* (2013.01)

(58) Field of Classification Search
  None
  See application file for complete search history.

(56) References Cited

U.S. PATENT DOCUMENTS

| | | | |
|---|---|---|---|
| 2014/0079195 A1* | 3/2014 | Srivastava | G10L 15/22 379/88.01 |
| 2018/0054523 A1* | 2/2018 | Zhang | G06F 16/90332 |
| 2022/0147863 A1* | 5/2022 | Chawla | G06N 20/00 |

* cited by examiner

*Primary Examiner* — Antim G Shah

(57) ABSTRACT

In some implementations, a device may obtain data indicating a client activity, and may determine predictive level scores corresponding to predictive level options associated with the client activity. The device may transmit, to a client device, a selected predictive level option having a highest predictive level score. The device may receive, from the client device, a client query based on a rejection of the selected predictive level option, and may determine intent level scores corresponding to intent level options associated with the client query. The device may identify a selected intent level option having a highest intent level score and may initiate client experience(s) associated with the selected intent level option. The predictive level scores and/or the intent level scores may be determined based on historical training data associated with combinations of client activities, predictive level options, client queries, intent level options, client experiences, and associated success scores.

20 Claims, 7 Drawing Sheets

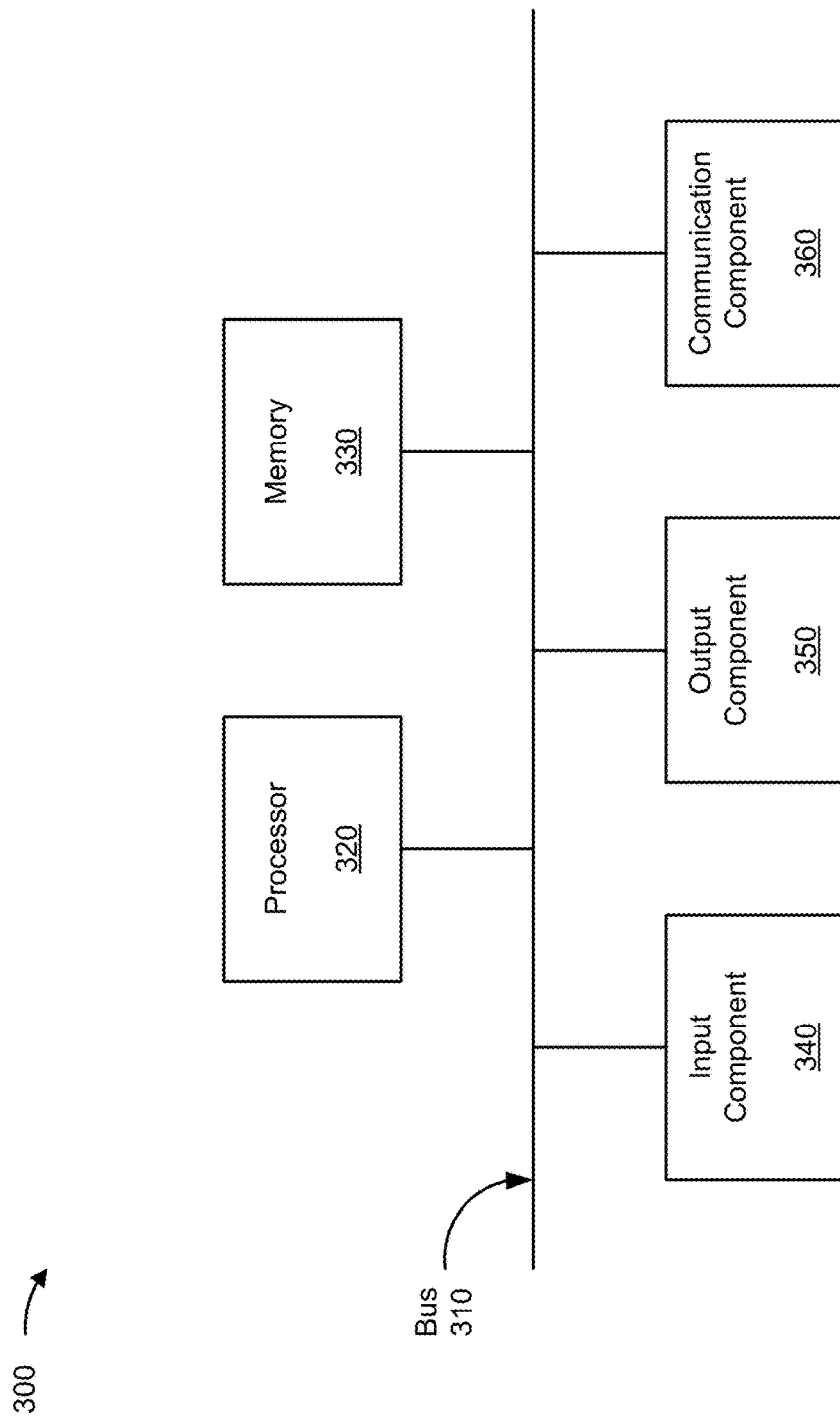

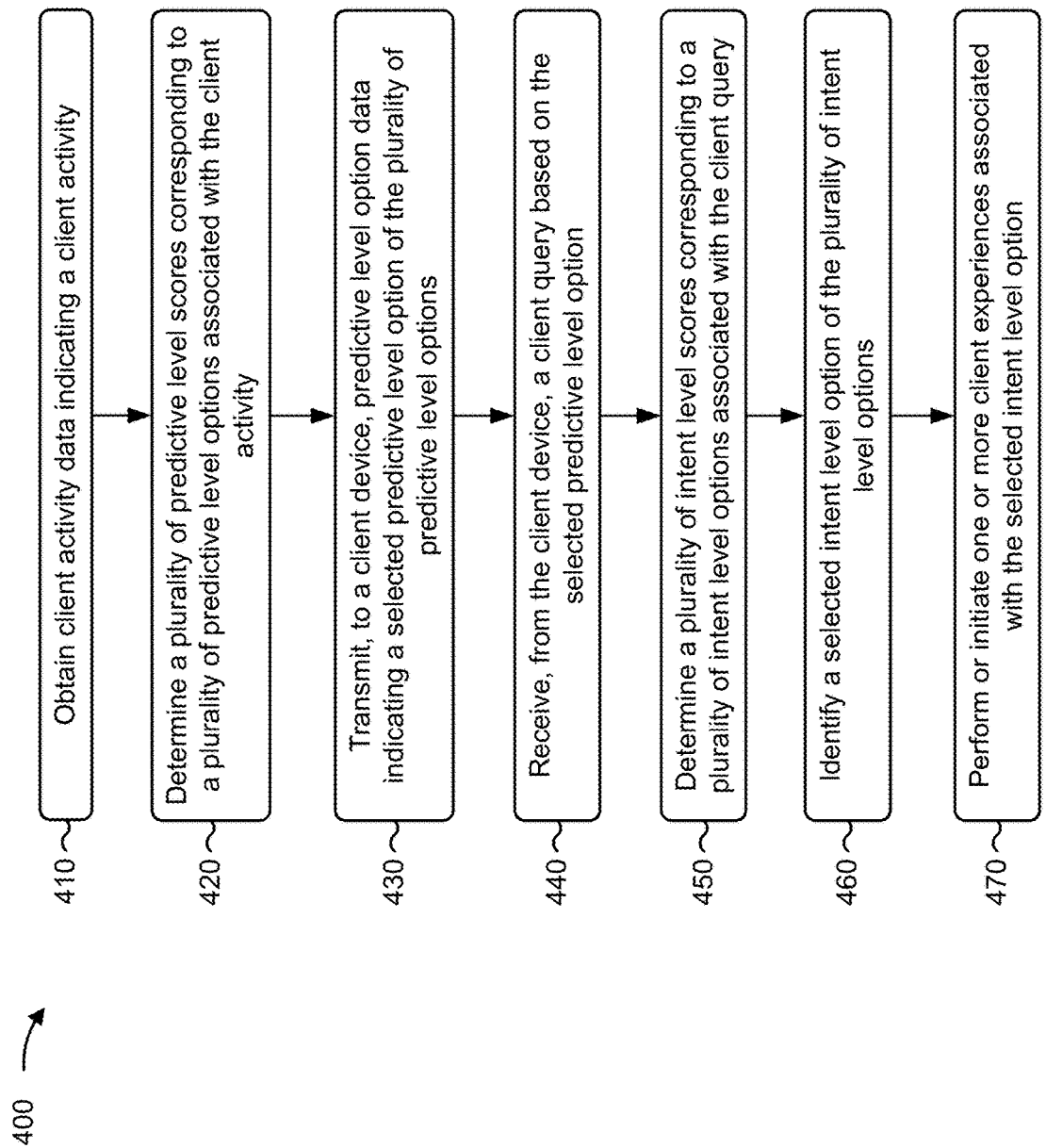

SYSTEMS AND METHODS FOR DETERMINING OPTIMUM CUSTOMER ROUTING PATH

BACKGROUND

A contact center (e.g., a call center and/or the like) is a centralized office used for receiving large volumes of inquiries via telephone, chat, and/or another form of communication. A contact center is often operated by a company to administer technical support relating to a product and/or a service for consumers. In some cases, contact centers may utilize cloud-based software as a service (SaaS) platforms, and use application programming interfaces (APIs) to integrate with cloud-based applications to interact with consumers. Developers use APIs to enhance cloud-based contact center platform functionality (e.g., using Computer Telephony Integration (CTI) APIs to provide basic telephony controls and sophisticated call handling, configuration APIs to enable Graphical User Interface (GUI) controls of administrative functions, and/or the like).

BRIEF DESCRIPTION OF THE DRAWINGS

FIG. 3 is a diagram of example components of one or more devices of FIG. 3.

FIG. 4 is a flowchart of an example process associated with determining optimum customer routing path.

DETAILED DESCRIPTION OF EXAMPLE EMBODIMENTS

Figure 1A:
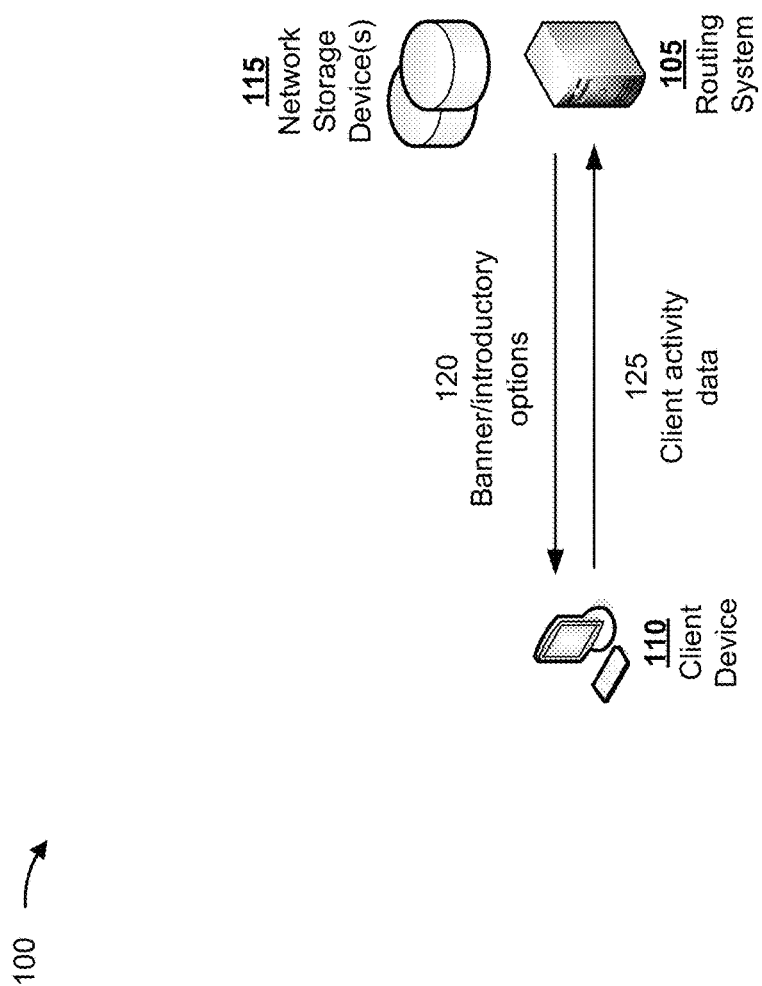
FIGS. 1A-1D are diagrams of an example associated with determining optimum customer routing path.
Figure 1B:
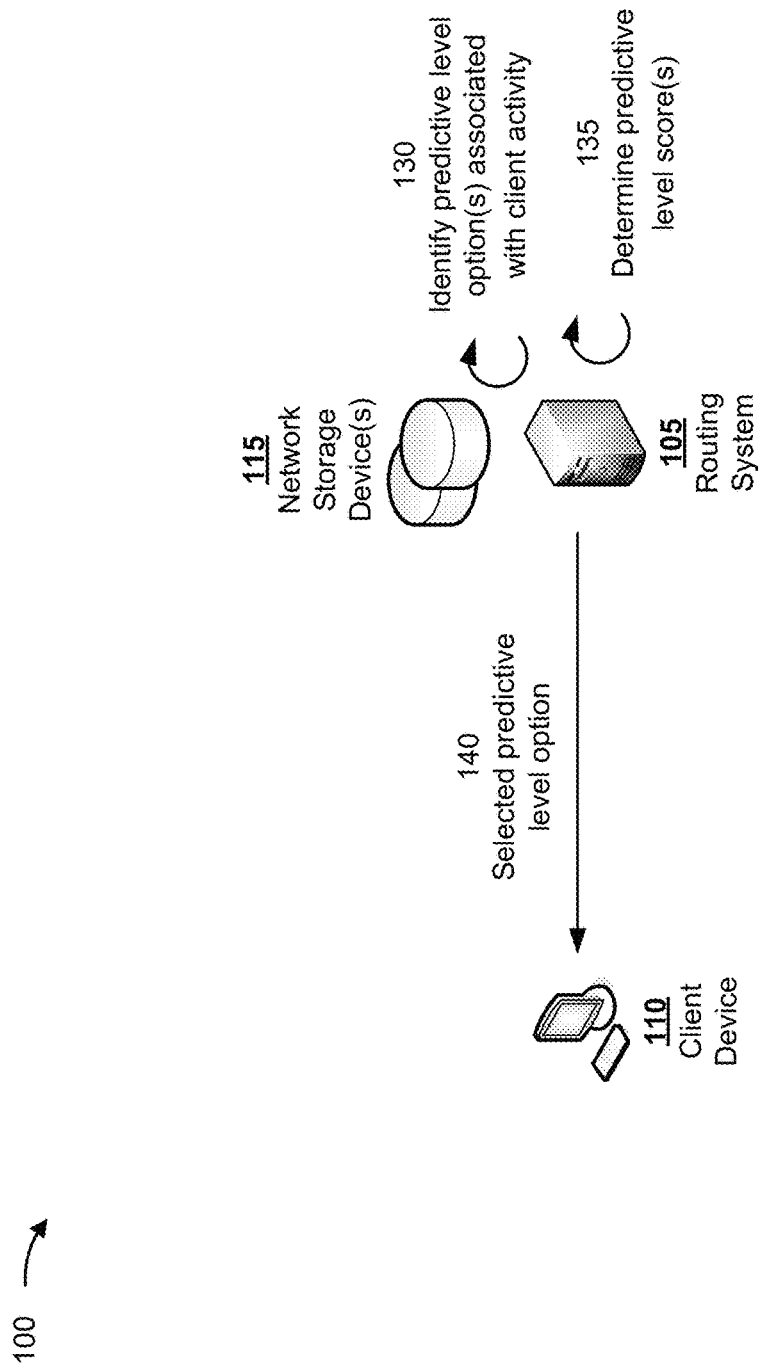

The following detailed description of example implementations refers to the accompanying drawings. The same reference numbers in different drawings may identify the same or similar elements.

In some instances, a client may need assistance and/or have questions related to a device and/or an account of the client. For example, the client may desire to obtain information associated with the account, perform an action associated with the account, or resolve an issue associated with the account. To receive the assistance/answers, the client may contact an entity associated with the device and/or account, such as through a contact center (e.g., a call center), a website, a chatbot, a voicebot, or the like associated with the entity. When the client contacts the entity, the client may be automatically provided with options relevant to the client's reason for contacting the entity, and routed along a particular path based on the client's selection of those options. However, the options provided to the client, and the path on which the client's contact with the entity is routed may not be the optimal path to ultimately resolve the client's issue (e.g., the path is not the most direct path and may involve re-routing), requiring unnecessary usage of computing resources and time of the entity and of the client device. As a result, the entity may not be able to service as many clients due to the depleted computing resources and time. Accordingly, it is desirable for a system to identify an optimum routing path for a client's contact with an entity to resolve any issues the client may have.

Some implementations described herein provide a system that is capable of determining and providing an optimum routing path for a client device of a client, such as when the client contacts a contact center. To do so, the system may determine, and transmit to the client device, a selected predictive level option associated with a client activity received from, or otherwise determined by the system, from the client device. The selected predictive level option may be selected from multiple predictive level options associated with the client activity, where the selected predictive level option may have a highest predictive level score, as determined by the system. The system may then receive a client query from the client device based on the selected predictive level option. The system may determine a selected intent level option associated with the client query. The selected intent level option may be selected from multiple intent level options associated with the client query, where the selected intent level option may have a highest intent level score, as determined by the system. The system may then perform or initiate a client experience associated with the selected intent level option, where the client experience is intended to address the client's reason for contacting the entity. By utilizing scores of different options at various levels along the routing path and selecting options with the highest score of the options at that level, the system is able to route the client and client device along the most efficient path to address the client's inquiry. Accordingly, the system may efficiently utilize computing resources and time, and as a result, may be able to service more customer contacts in a particular day.

FIGS. 1A-1D are diagrams of an example 100 associated with determining optimum contact center routing path. As shown in FIGS. 1A-1D, example 100 includes a routing system 105, a client device 110, and one or more network storage devices 115. While example 100 is described below in connection with client contact with a contact center associated with an entity, example 100 may be applicable to other forms of contact associated with the entity, such as a website, a chatbot, a voicebot, or the like.

As shown in FIG. 1A, a client may contact a contact center associated with an entity (e.g., via the client device 110) to obtain information, perform an action, and/or resolve an issue associated with an account of the client. For example, a user may use the client device 110 to call the contact center. As another example, the client device 110 may send a query to the contact center via an application installed on the client device 110 or via a web-based application accessed via the client device 110. In either example, the routing system 105 may receive the particular form of contact (e.g., the call or the query).

As shown by reference number 120, in response to the client contact with the contact center, the routing system 105 may provide different banner or introductory options from which the client (via the client device 110) may select an option to begin the routing path of the interaction with the contact center. For example, in a scenario in which the client contact is in the form of voice contact (e.g., a call), the routing system 105 may provide, to the client device 110, an interactive voice response (IVR) message containing the banner or introductory options (e.g., as a greeting to the client). As another example, in a scenario in which the client contact is via an application (e.g., via a chatbot in the application), the routing system 105 may provide the banner or introductory options in a user interface (e.g., a chat or message window) presented on the client device 110. The routing system 105 may obtain the banner or introductory options from a network storage device 115 (e.g., over a network such as a network branch exchange).

As shown by reference number 125, the routing system 105 may receive, from the client device 110, or otherwise obtain client activity data indicating a client activity by the client and/or the client device 110 associated with the client's account. For example, the routing system 105 may obtain the client activity data from the selected option (e.g., from the banner/introductory options). The client activity may be associated with the particular selected option.

In some implementations, the routing system 105 may determine and/or assign a client activity score associated with the client activity. For example, the client activity score may be a value in a range (e.g., −1 to 1) and may be indicative of a popularity of the particular client activity (e.g., how frequently the particular client activity was selected by other clients). As another example, the client activity score may be a set value (e.g., 0) indicating the start of the routing path. In some implementations, the routing system 105 may use a model (e.g., a machine learning model, a numerical computational model, or a statistical model) to determine the client activity score, as described in more detail below in connection with FIG. 1D.

As shown by reference number 130, from the client activity, the routing system 105 may advance the routing path to a predictive level in which the routing system 105 may identify and provide, to the client device 110, one or more predictive level options. The predictive level option(s) may be based on the client activity and may be obtained from a network storage device 115 (e.g., over the network branch exchange), which may be the same as or different from the network storage device 115 from which the routing system 105 obtained the banner/introductory options. For example, a client activity of viewing a bill associated with the client's account may have a predictive level option of viewing the bill. As another example, a client activity of autopay (e.g., which may be set up as an option associated with the client's account) may include predictive level options of enrollment discounts, impending expiration (e.g., within a time threshold) of a transaction card associated with the user's account, and/or failure to timely make a payment associated with the client's account. As another example, a client activity of no mobile connection (e.g., a network outage) may have predictive level options of a service disruption, a subscriber identity module (SIM) card issue (of the client device 110 or another device associated with the client or client's account), or an issue with the client device 110 (or another device associated with the client or client's account). In some implementations, the predictive level option(s) associated with a particular client activity may be based on historical data associated with historical routing paths of the client and/or other clients. The historical data may indicate different predictive level options that were associated with different client activities in the historical routing paths. The historical data may be stored on and obtained from the network storage device. In some implementations, a model (e.g., a machine learning model) may be used to modify (e.g., remove, add, or otherwise alter) the predictive level options associated with a particular client activity.

As shown by reference number 135, the routing system 105 may determine predictive level scores corresponding to the predictive level options. The predictive level scores may be based on historical data of historical contacts by clients with the contact center. For example, the historical data may indicate how often a particular one of the predictive level options were selected by the client for the particular client activity. Additionally, or alternatively, the historical data may indicate the success of the particular predictive level option in addressing the client's reason for contacting the contact center (e.g., based on feedback, such as a satisfaction score, provided by the client via the client device 110). The historical data may be stored on and accessed from a network storage device 115 (e.g., over the network branch exchange).

Each predictive level score may be a value on a scale (e.g., ranging between −1 and 1). In some implementations, a higher and/or a positive score may indicate a higher success rate. The predictive level scores may be unique to a particular client. For example, the predictive level scores may depend on factors unique to the particular client's account information (e.g., a balance, a type of account, a location associated with the client, a credit history associated with the client, or the like). As a result, a predictive level score corresponding to a particular predictive level option for one client may be higher (and/or positive) than the predictive level score for the same predictive level option for another client. In some implementations, the routing system 105 may use a model (e.g., a machine learning model, a numerical computational model, or a statistical model), to determine the predictive level scores, as described in more detail below in connection with FIG. 1D. The model may be the same as or may be separate from the model used to determine the client activity score. As shown by reference number 140, the routing system 105 may provide one or more selected predictive level options, of the different predictive level options associated with the client activity, to the client device. The selected predictive level option(s) may have the highest predictive level scores.

In some scenarios, the selected predictive level option(s) may result in a further client query received from the client device 110. For example, the client (via the client device 110) may reject the selected predictive level option(s) if the client does not find the selected predictive level option(s) relevant to the particular client activity. In such a scenario, the routing system 105 may receive, from the client device 110, rejection data indicating the rejection by the client of the selected predictive level option(s). As another example, the client may want to inquire about the selected predictive level option(s).

Figure 1C:
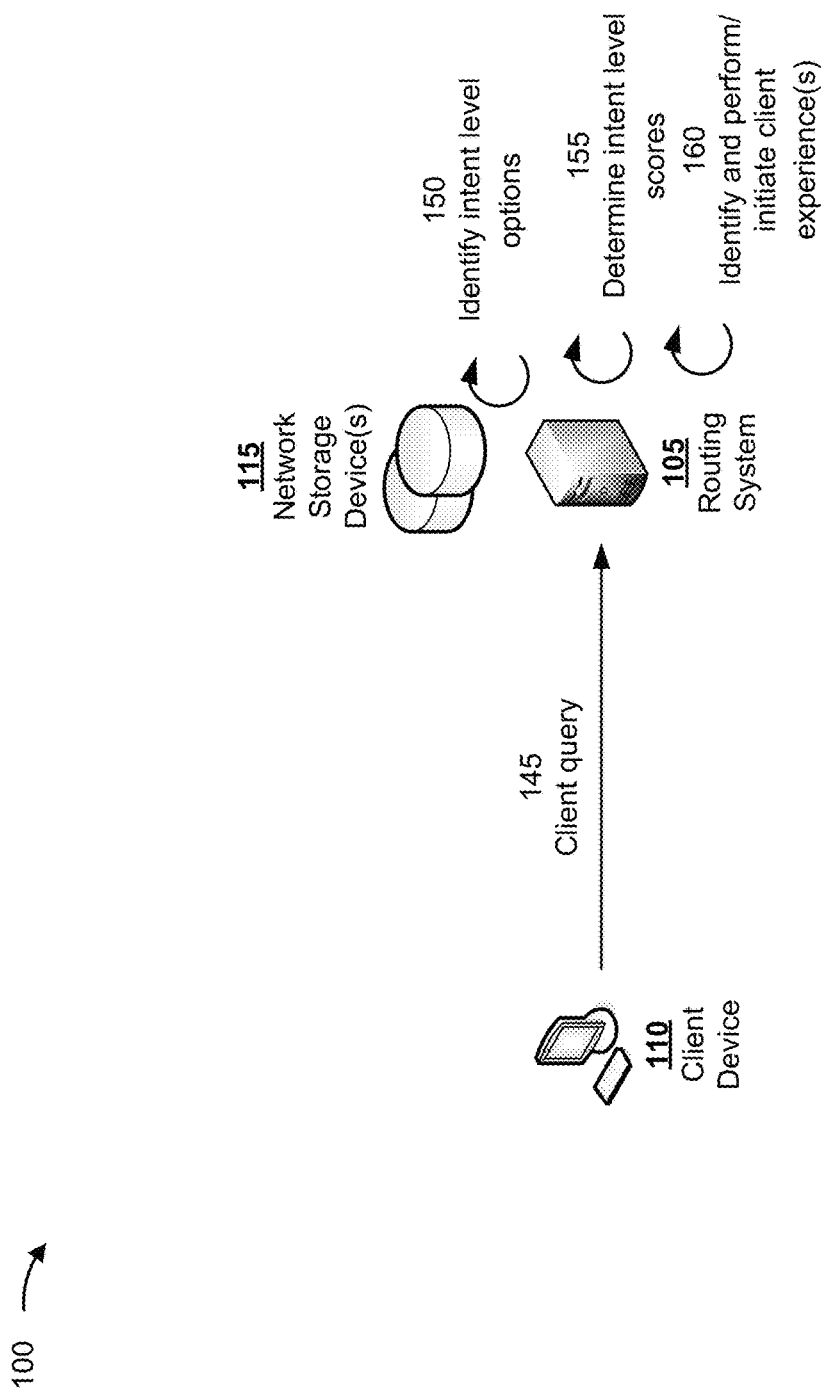

In either scenario, as shown in FIG. 1C, and by reference number 145, the routing system 105 may receive, from the client device 110, a query (also referred to as a client query) by the client. The query may be related to the client activity and/or the selected predictive level option(s). For example, for a client activity and/or selected predictive level option of viewing a bill associated with the client's account, a query may be to check the bill and/or why the bill is high. As another example, for a client activity of autopay and/or selected predictive level options of enrollment discounts, impending expiration of a transaction card associated with the client's account, and/or a payment failure (as described above), the query may be that the autopay is not working. As another example, for a client activity of no mobile signal and/or selected predictive level options of service disruption, a SIM card issue, and/or a client device issue (as described above), the query may be that the client is unable to make calls. The query may be selected by the client (via the client device 110) from different possible query options provided by the routing system 105 to the client device 110. Alternatively, the client may manually input the query (e.g., via a voice input). In such a scenario, the routing system 105 may be able to recognize and/or process the voice data received from the client device 110 to determine the query.

In some implementations, the routing system 105 may determine and/or assign a score associated with the query.

For example, the query score (also referred to as a client query score) may be a value on a scale (e.g., ranging between −1 and 1). The query score may be a set value (e.g., 0.5) indicating the query stage/level of the routing path. In some implementations, the routing system 105 may use a model (e.g. a machine learning model, a numerical computational model, or a statistical model), to determine the client activity score, as described in more detail below in connection with FIG. 1D. The model may be the same as or may be separate from the model(s) used to determine the client activity score and/or the predictive level scores.

As shown by reference number 150, from the client query, the routing system 105 may advance the routing path to an intent level in which the routing system 105 may identify one or more intent level options. The intent level option(s) may be based on the query and may be obtained from a network storage device 115 (e.g., over the network branch exchange), which may be the same as or different from the network storage devices 115 described above. For example, a query of a high bill or bill check may have an intent level option of high data usage, roaming usage, international usage, or the like. As another example, a query of autopay not working may have intent level options of the intent level options of the transaction card being expired, the transaction card being blocked, the client's account not having enough balance or available credit, or the like. As another example, for a query of the client being unable to make calls, the intent level options may include a weak signal, an outage in an area associated with the client device 110, an issue with the client device 110, weather, or the like.

As shown by reference number 155, the routing system 105 may determine intent level scores corresponding to the intent level options. The intent level scores may be based on historical data of historical contacts by clients with the contact center. For example, the historical data may indicate the success of a particular intent level option in addressing the client's reason for contacting the contact center (e.g., based on feedback, such as a satisfaction score, provided by the client via the client device 110). The historical data may be stored on and accessed from a network storage device 115 (e.g., over the network branch exchange). Each intent level score may be a value on a scale (e.g., ranging between −1 and 1). In some implementations, a higher and/or a positive score may indicate a higher success rate. The intent level scores may be unique to a particular client. For example, the intent level scores may depend on factors unique to the particular client's account information (e.g., a balance, a type of account, a location associated with the client, a credit history associated with the client, or the like). As a result, an intent level score corresponding to a particular intent level option for one client may be higher (and/or positive) than the intent level score for the same intent level option for another client. In some implementations, the routing system 105 may use a model (e.g., a machine learning model, a numerical computational model, or a statistical model) to determine the intent level scores, as described in more detail below in connection with FIG. 1D. The model may be the same as or may be separate from the model(s) used to determine other scores as described above As shown by reference number 160, the routing system 105 may identify one or more client experiences associated with a selected intent option having a highest intent level score. The client experience(s) may be initiated and/or performed by the routing system 105. The client experience (s) may be obtained from a network storage device 115 (e.g., over the network branch exchange), which may be the same as or different from the network storage devices 115 described above. For example, for a selected intent level option of high data usage, a client experience may be to turn on or activate a data saver option. As another example, for a selected intent level option of international usage, a client experience may be to turn on or activate an international plan. As another example, for a selected intent level option of a transaction card being expired, client experiences may include updating/renewing the account and subsequently continuing an autopay subscription and/or obtaining free credits. As another example, for a selected intent level of a transaction card being blocked, client experiences may be to unblock the card and/or perform a fraud check. As another example, for a selected intent level option of an account not having enough balance or available credit, a client experience may be to obtain free credits. As another example, for a selected intent level option of a weak signal, client experiences may be to check and/or reset settings of the client device, reach a nearest open-area signal zone, provide an estimated time of a network resolution, and/or prioritize emergency communications for the client. One or more of these client experiences may be associated with other intent level options, such as outages in an area associated with the client device 110, issues with the client device 110, and/or weather. As further shown by reference number 160, the routing system 105 may perform or initiate the client experience(s).

In some implementations, the routing system 105 may determine and/or assign a client experience score associated with each client experience. For example, the client experience score may be a value on a scale (e.g., ranging between −1 and 1). The client experience score may be based on feedback by the client received from the client device 110. In some implementations, the routing system 105 may use a model (e.g., a machine learning model, a numerical computational model, or a statistical model) to determine the client experience score, as described in more detail below in connection with FIG. 1D. The model may be the same as or may be separate from the model(s) used to determine other scores as described above.

In some implementations, an optimum routing path would successively increase in values of the client activity score (e.g., 0), the predictive level score (e.g., 0.2), the query score (e.g., 0.5), the intent level score (e.g., 0.8), and the client experience score (e.g., 0.9). If the scores change direction, such as if the intent level score (e.g., −0.2) and/or the client experience score (e.g., −0.7) are negative scores, then the routing path is not the optimum path, and would not be selected by the routing system 105.

Figure 1D:
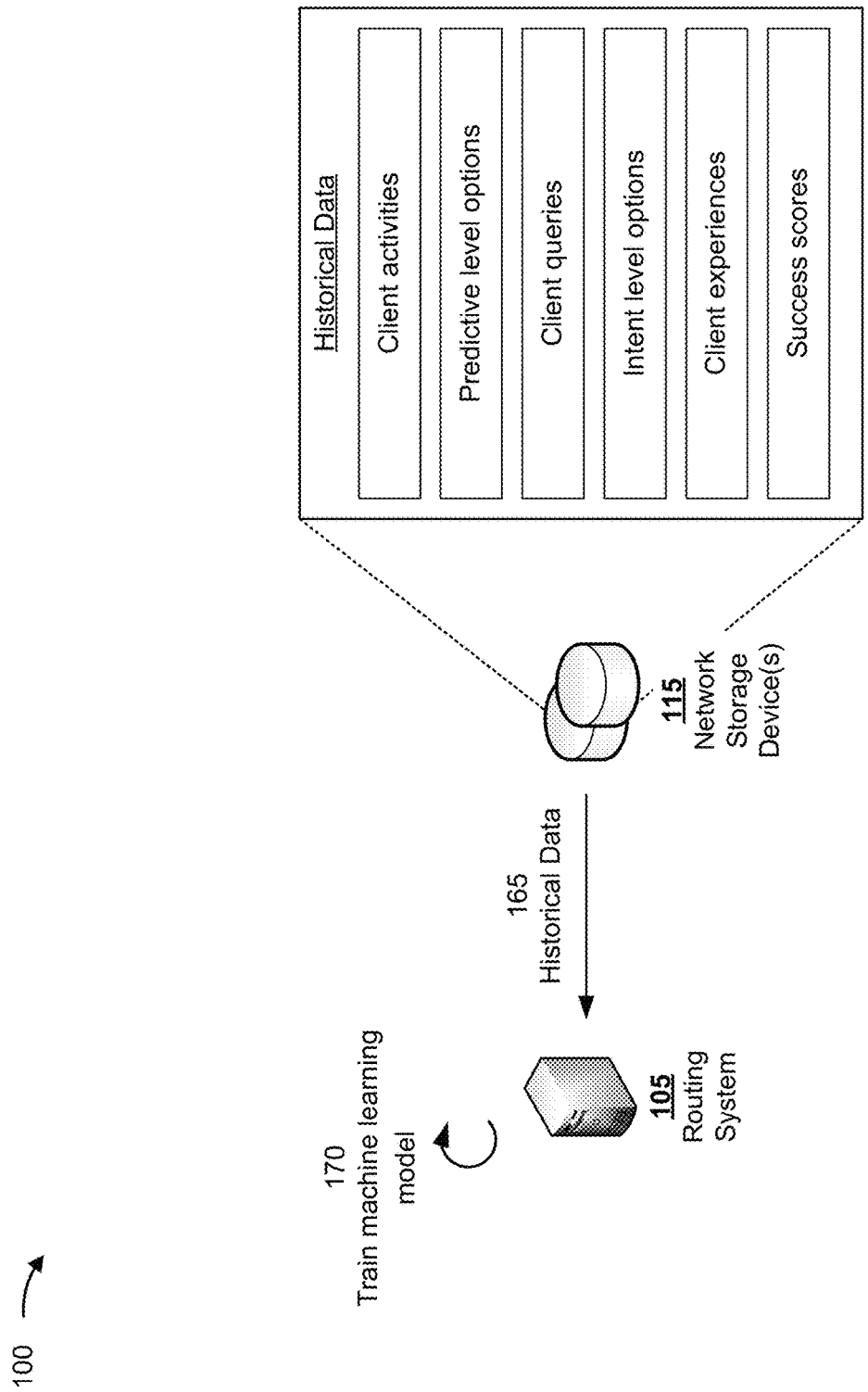

As shown in FIG. 1D, in some implementations, the routing system 105 may use one or more models to determine and assign client activity scores, predictive level scores, query scores, intent level scores, and/or client experience scores. For example, as shown by reference number 165, the routing system 105 may receive historical data from one or more network storage devices 115. The historical data may be associated with a plurality of combinations of client activities, predictive level options, queries, intent level options, client experiences, and success scores associated with the plurality of combinations associated with the client activity. As shown by reference number 170, in implementations in which the routing system uses one or more machine learning models to determine the scores, the routing system 105 may train the machine learning model(s) based on the historical data. Additionally, the routing system 105 may re-train the machine learning model(s) based on feedback received from the client device 110 regarding the success of the routing path in addressing the client's reason for contacting the contact center. In some implementations, the machine learning model(s) may be a sequence-based model (e.g., long short-term memory (LSTNI), gated recurrent unit (GRU), recurrent neural network (RNN), attention-based neural network, or the like). A sequence-based model may allow the routing system 105 to generate scores for each level or sub-sequence (e.g., the client activity score, the predictive level score, the query score, the intent level score, and/or the client experience score). Accordingly, the routing system 105 may generate the scores in real-time as each event occurs and/or to proactively generate score for future events. As a result, the routing system 105 may be able to determine the importance of each event in the routing path for future events to decide the optimum routing path without needing all of the events by the model.

As described above, the routing system 105 may determine, and transmit to the client device 110, a selected predictive level option associated with a client activity. The selected predictive level option may be selected from multiple predictive level options associated with the client activity, where the selected predictive level option may have a highest predictive level score, as determined by the routing system 105. The routing system 105 may receive a client query from the client device 110 based on the selected predictive level option. The routing system 105 may determine a selected intent level option associated with the client query. The selected intent level option may be selected from multiple intent level options associated with the client query, where the selected intent level option may have a highest intent level score, as determined by the routing system 105. The routing system 105 may then perform or initiate a client experience associated with the selected intent level option, where the client experience is intended to address the client's reason for contacting the contact center. By utilizing scores of different options at various levels along the routing path, and selecting options with the highest score of the options at that level, the routing system 105 is able to route the client and client device 110 along the most efficient path to address the client's issue/question/request. Accordingly, the routing system 105 may preserve computing and network resources, and as a result, the contact center may be able to service more customer contacts in a particular day.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
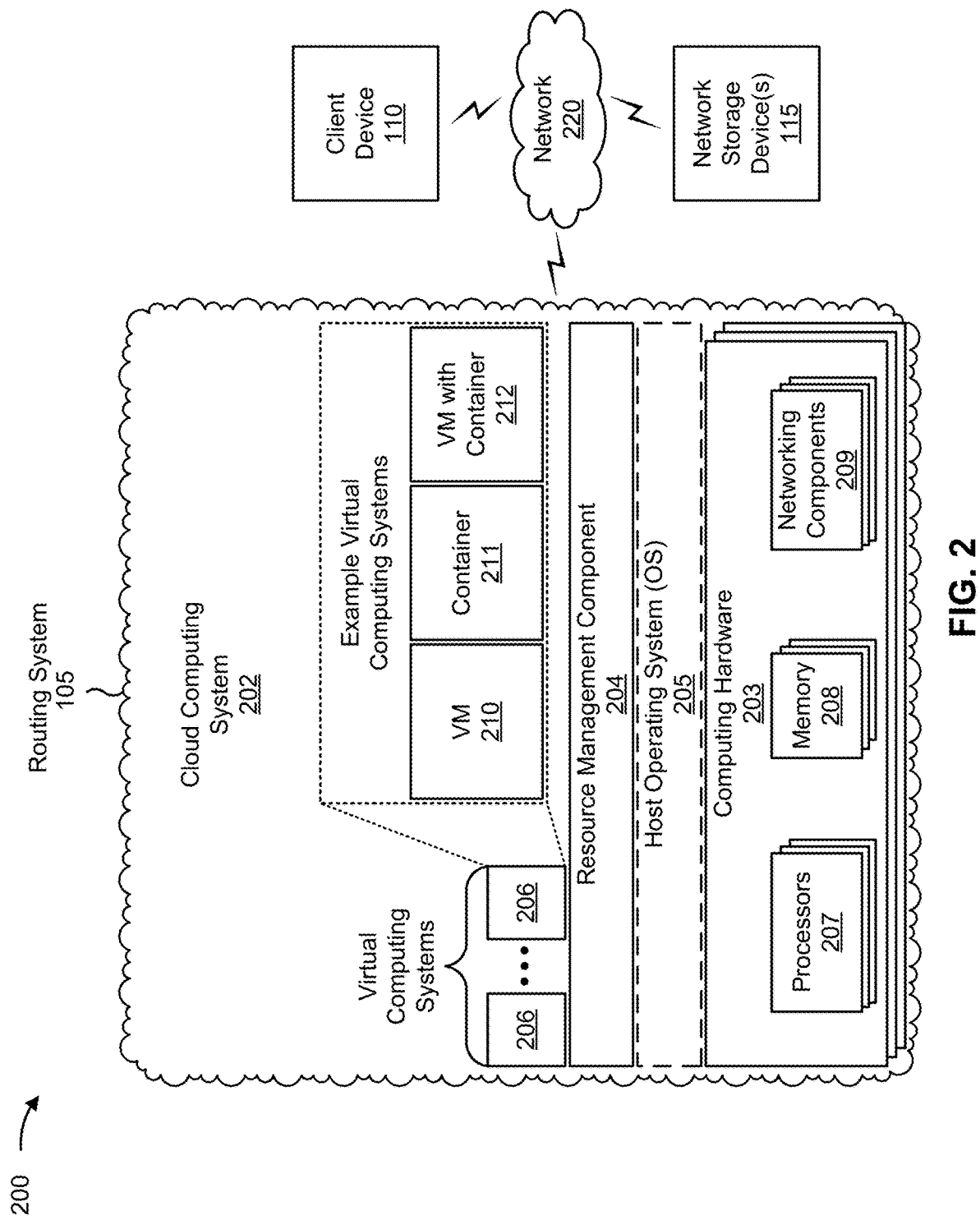
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a routing system 105, which may include one or more elements of and/or may execute within a cloud computing system 202. The cloud computing system 202 may include one or more elements 203-212, as described in more detail below. As further shown in FIG. 2, environment 200 may include a client device 110, network storage device(s) 115, and/or a network 220. Devices and/or elements of environment 200 may interconnect via wired connections and/or wireless connections.

The client device 110 includes one or more devices capable of receiving, generating, storing, processing, and/or providing information associated with determining optimum contact center routing path, as described elsewhere herein. The client device 110 may include a communication device and/or a computing device. For example, the client device 110 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network storage device(s) 115 includes one or more devices capable of receiving, generating, storing, processing, and/or providing information associated with determining optimum contact center routing path, as described elsewhere herein. The network storage device(s) 115 may include a communication device and/or a computing device. For example, the network storage device(s) 115 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the network storage device(s) 115 may store account information (e.g., a balance, a type of account, a location associated with the client, a credit history associated with the client, or the like), banner/introductory options, associations between client activities and predictive level options, associations between client queries and intent level options, associations between intent level options and client experiences, or the like, as described elsewhere herein.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the routing system 105 may include one or more elements 203-212 of the cloud computing system 202, may execute within the cloud computing system 202, and/or may be hosted within the cloud computing system 202, in some implementations, the routing system 105 may not be cloud-based (e.g., may be implemented outside of a cloud computing system) or may be partially cloud-based. For example, the routing system 105 may include one or more devices that are not part of the cloud computing system 202, such as device 300 of FIG. 3, which may include a stand-alone server or another type of computing device. The routing system 105 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300 associated with determining optimum contact center routing path. Device 300 may correspond to routing system 105, client device 110, and/or network storage device(s) 115. In some implementations, routing system 105, client device 110, and/or network storage device(s) 115 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with determining optimum contact center routing path. In some implementations, one or more process blocks of FIG. 4 may be performed by a device (e.g., routing system 105). In some implementations, one or more process blocks of FIG. 4 may be performed by one or more components of device 300, such as processor 320, memory 330, input component 340, output component 350, and/or communication component 360.

As shown in FIG. 4, process 400 may include obtaining client activity data indicating a client activity (block 410). For example, the device may obtain client activity data indicating a client activity, as described above. In some implementations, the client activity may be associated with a client account. In some implementations, process 400 may include determining a client activity score associated with the client activity.

As further shown in FIG. 4, process 400 may include determining a plurality of predictive level scores corresponding to a plurality of predictive level options associated with the client activity (block 420). For example, the device may determine a plurality of predictive level scores corresponding to a plurality of predictive level options associated with the client activity, as described above.

As further shown in FIG. 4, process 400 may include transmitting, to a client device associated with the client account, predictive level option data indicating a selected predictive level option of the plurality of predictive level options (block 430). For example, the device may transmit, to a client device associated with the client account, predictive level option data indicating a selected predictive level option of the plurality of predictive level options, as described above. In some implementations, the selected predictive level option may have a highest predictive level score of the plurality of predictive level scores.

As further shown in FIG. 4, process 400 may include receiving, from the client device, a client query based on the selected predictive level option (block 440). For example, the device may receive, from the client device, a client input of a client query based on a rejection of the selected predictive level option, as described above. In some implementations, the client query may be received as voice data. In some implementations, process 400 may include determining a client query score associated with the client query.

As further shown in FIG. 4, process 400 may include determining a plurality of intent level scores corresponding to a plurality of intent level options associated with the client query (block 450). For example, the device may determine a plurality of intent level scores corresponding to a plurality of intent level options associated with the client query, as described above.

As further shown in FIG. 4, process 400 may include identifying a selected intent level option of the plurality of intent level options (block 460). For example, the device may identify a selected intent level option of the plurality of intent level options, as described above. In some implementations, the selected intent level option may have a highest intent level score of the plurality of intent level scores.

As further shown in FIG. 4, process 400 may include performing or initiating one or more client experiences associated with the selected intent level option (block 470).

For example, the device may perform or initiating one or more client experiences associated with the selected intent level option. In some implementations, process 400 may include determining one or more experience level scores associated with the one or more client experiences.

In some implementations, the client activity score, the predictive level scores, the client query score, the intent level scores, and/or the client experience scores may be determined based on historical data associated with a plurality of combinations of client activities, predictive level options, client queries, intent level options, client experiences, and success scores associated with the plurality of combinations. In some implementations, the client activity score, the predictive level scores, the client query score, the intent level scores, and/or the client experience scores may be determined using a machine learning model trained based on the historical data. In some implementations, process 400 may include re-training the machine learning model based on feedback received from the client device regarding the one or more client experiences. In some implementations, the machine learning model may be a sequence-based model (e.g., LSTM, GRU, RNN, attention-based neural network, or the like).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining, by a device, client activity data indicating a client activity associated with a client account;
   determining, by the device, a plurality of predictive level scores corresponding to a plurality of predictive level options associated with the client activity;
   transmitting, by the device and to a client device associated with the client account, predictive level option data indicating a selected predictive level option, of the plurality of predictive level options, having a highest predictive level score of the plurality of predictive level scores;
   receiving, by the device and from the client device, a client query based on the selected predictive level option;
   determining, by the device, a plurality of intent level scores corresponding to a plurality of intent level options associated with the client query;
   identifying, by the device, a selected intent level option, of the plurality of intent level options, having a highest intent level score of the plurality of intent level scores; and
   performing or initiating, by the device, one or more client experiences associated with the selected intent level option,
      wherein one or more of the plurality of predictive level scores or the plurality of intent level scores are determined based on historical data associated with a plurality of combinations of client activities, predictive level options, client queries, intent level options, client experiences, and success scores associated with the plurality of combinations.

2. The method of claim 1, wherein the one or more of the plurality of predictive level scores or the plurality of intent level scores are determined using a machine learning model trained using the historical data, and
   wherein the method further comprises:
      re-training the machine learning model based on feedback received from the client device regarding the one or more client experiences.

3. The method of claim 2, wherein the machine learning model is a sequence-based model.

4. The method of claim 1, further comprising:
   obtaining client data associated with the client account; and
   identifying the plurality of predictive level options based on the client data.

5. The method of claim 1, wherein the client query is received as voice data.

6. The method of claim 1, further comprising:
   determining a client activity score associated with the client activity.

7. The method of claim 1, further comprising:
   determining a client query score associated with the client query.

8. The method of claim 1, further comprising:
   determining one or more experience level scores associated with the one or more client experiences.

9. A device, comprising:
   one or more processors configured to:
      obtain client activity data indicating a client activity associated with a client account;
      determine a plurality of predictive level scores corresponding to a plurality of predictive level options associated with the client activity;
      transmit, to a client device associated with the client account, predictive level option data indicating a selected predictive level option, of the plurality of predictive level options, having a highest predictive level score of the plurality of predictive level scores;
      receive, from the client device, a client query based on the selected predictive level option;
      determine a plurality of intent level scores corresponding to a plurality of intent level options associated with the client query;
      identify a selected intent level option, of the plurality of intent level options, having a highest intent level score of the plurality of intent level scores; and
      perform or initiate one or more client experiences associated with the selected intent level option,
         wherein one or more of the plurality of predictive level scores or the plurality of intent level scores are determined based on historical data associated with a plurality of combinations of client activities, predictive level options, client queries, intent level options, client experiences, and success scores associated with the plurality of combinations.

10. The device of claim 9, wherein the one or more processors are further configured to:
   train a machine learning model based on the historical data;
   use the machine learning model to determine the plurality of predictive level scores and the plurality of intent level scores; and re-train the machine learning model based on feedback received from the client device.

11. The device of claim 10, wherein the machine learning model is a sequence-based model.

12. The device of claim 9, wherein the client activity data is obtained over a network branch exchange.

13. The device of claim 9, wherein the one or more processors are further configured to:
provide, to the client device, an interactive voice response in response to a call received from the client device; and
wherein the one or more processors, when obtaining the client activity data, are configured to:
receive, from the client device, the client activity data.

14. The device of claim 9, wherein the one or more processors are further configured to:
process voice data, received from the client device, to determine the client query.

15. A non-transitory computer-readable medium storing a set of instructions, the set of instructions comprising:
one or more instructions that, when executed by one or more processors of a device, cause the device to:
obtain client activity data indicating a client activity associated with a client account;
determine a plurality of predictive level scores corresponding to a plurality of predictive level options associated with the client activity;
transmit, to a client device associated with the client account, predictive level option data indicating a selected predictive level option, of the plurality of predictive level options, having a highest predictive level score of the plurality of predictive level scores;
receive, from the client device, a client query based on the selected predictive level option;
determine a plurality of intent level scores corresponding to a plurality of intent level options associated with the client query;
identify a selected intent level option, of the plurality of intent level options, having a highest intent level score of the plurality of intent level scores; and
perform or initiate one or more client experiences associated with a selected intent level option,
wherein one or more of the plurality of predictive level scores or the plurality of intent level scores are determined based on historical data associated with a plurality of combinations of client activities, predictive level options, client queries, intent level options, client experiences, and success scores associated with the plurality of combinations.

16. The non-transitory computer-readable medium of claim 15, wherein the one or more instructions, when executed by the one or more processors, further cause the device to:
receive, from the client device, feedback associated with the one or more client experiences; and
determine one or more client experience scores based on the feedback.

17. The non-transitory computer-readable medium of claim 15, wherein the client activity data is obtained from a network storage device over a network branch exchange.

18. The non-transitory computer-readable medium of claim 15, wherein data indicating the plurality of predictive level options, the plurality of intent level options, and the one or more client experiences is obtained over a network branch exchange.

19. The non-transitory computer-readable medium of claim 15, wherein the client query is received as voice data.

20. The non-transitory computer-readable medium of claim 15, wherein the one or more instructions, when executed by the one or more processors, further cause the device to:
determine a client query score associated with the client query.

* * * * *